Figure 1:
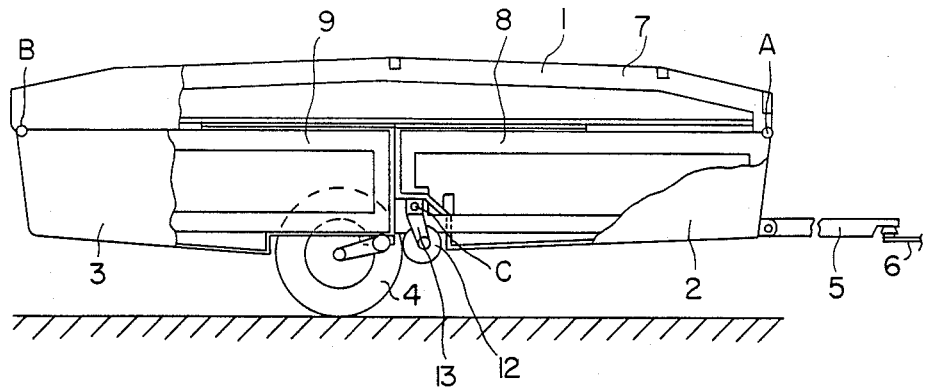

United States Patent [19]

Jansen

[11] Patent Number: 4,863,212
[45] Date of Patent: Sep. 5, 1989

[54] TRAILER

[76] Inventor: Johannes F. M. Jansen, 22 Huybergseweg, 4631 Ge Hoogerheide, Netherlands

[21] Appl. No.: 143,932

[22] Filed: Jan. 14, 1988

[30] Foreign Application Priority Data

Jan. 15, 1987 [NL] Netherlands ............. 8700090

[51] Int. Cl.$^4$ ............................................. B60R 15/00
[52] U.S. Cl. .................................................. 296/173
[58] Field of Search ............... 296/165, 168, 169, 172, 296/173, 176

[56] References Cited

U.S. PATENT DOCUMENTS

| | | | |
|---|---|---|---|
| 3,050,331 | 8/1962 | Mansen | 296/173 |
| 3,531,151 | 9/1970 | Branfield | 296/173 |
| 3,838,880 | 10/1974 | Lefebvre | 296/173 |
| 4,114,942 | 9/1978 | Greiner | 296/172 |

Primary Examiner—Joseph F. Peters, Jr.
Assistant Examiner—Jesûs D. Sotelo
Attorney, Agent, or Firm—John P. Snyder

[57] ABSTRACT

A convertible trailer includes front, rear and roof parts in which the front and rear parts fold toward each other from and beneath the roof part for towing and fold outward from the roof and away from each other during conversion to living space accommodation. Side wall spaces between the front and rear parts when converted are filled by accordion-folded side wall parts accommodated within the front and rear parts. Likewise, accordion-folded floor part are accommodated within at least one of the front or rear parts to fill a floor space when the part are converted.

20 Claims, 4 Drawing Sheets

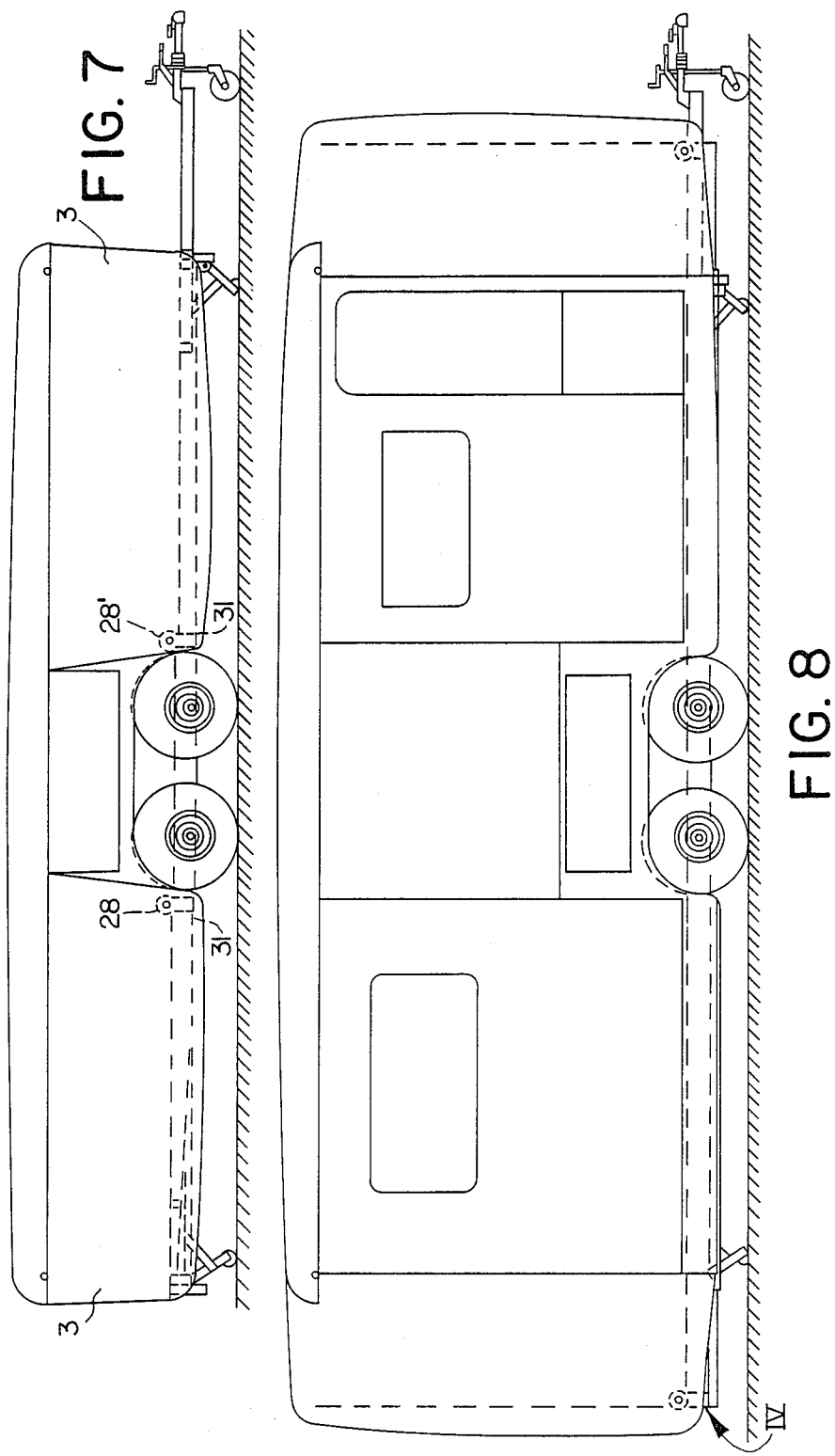

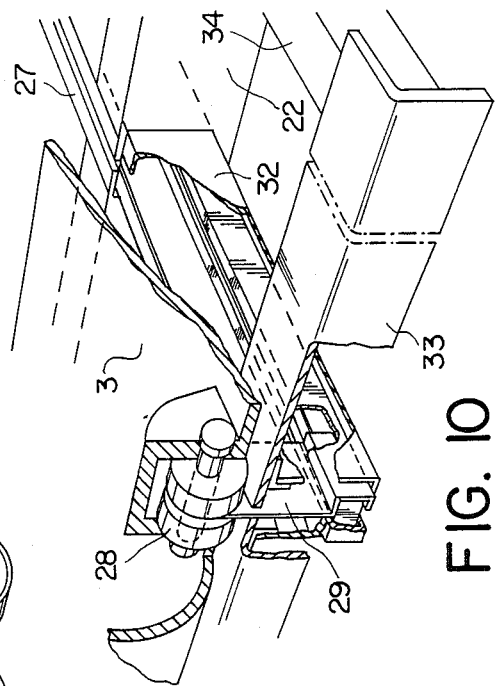
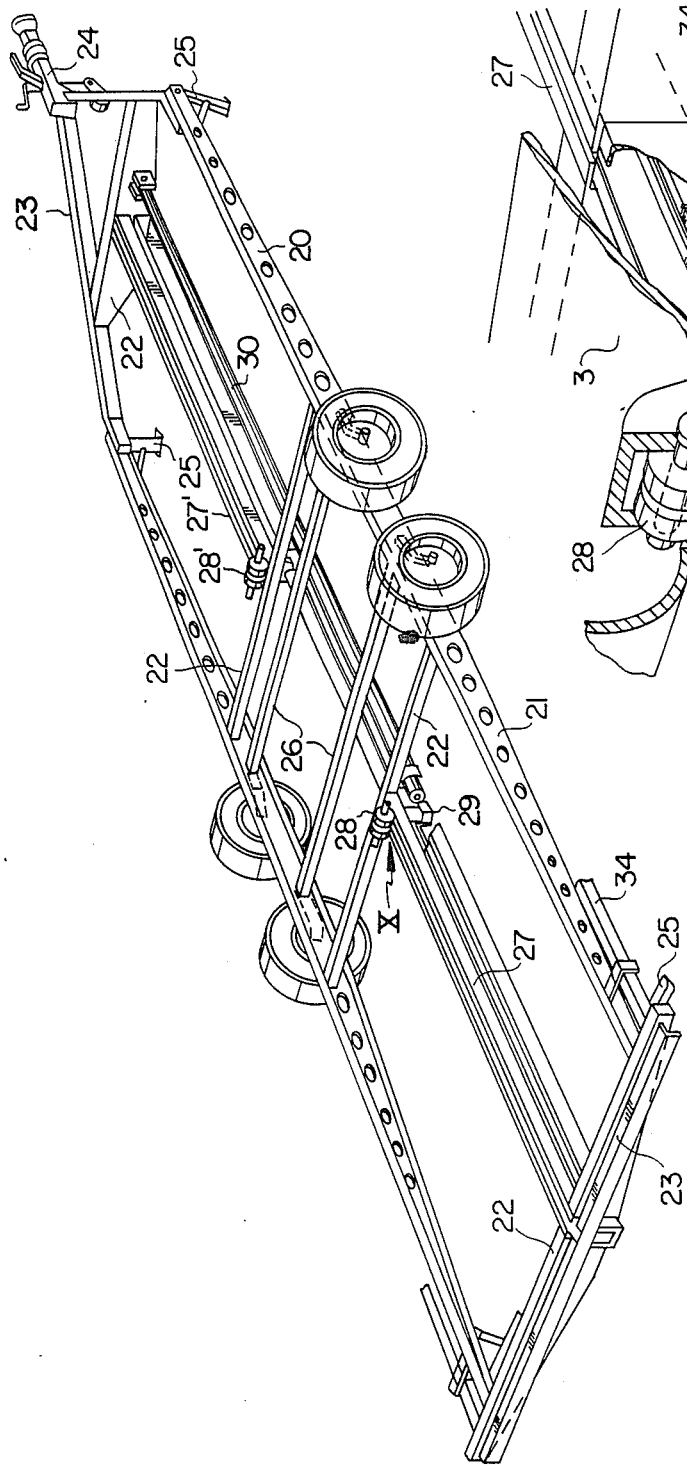
FIG. 10
FIG. 9

TRAILER

The invention relates to a trailer for providing residential, temporary or transport accommodation, such as a caravan, consisting substantially of a roof part in addition to a front and rear wall part and at least one wheel set with tow-bar bearing these parts. The invention relates particularly to a folding trailer.

Folding trailers are known in many forms, the object being to considerably decrease the air resistance during travel and to improve the maneuverability of the train consisting of the pulled and pulling vehicle. Although many of these trailers are comparatively simple and can be set up in a short time, there are however a number of drawbacks attached to them. Setting up has to be carried out with some proficiency, which not everyone possesses. The trailers are moreover often formed with tent-cloth or canvas, which does not contribute to the durability of such trailers.

The invention has for its object to obviate the above stated drawbacks and provides for this purpose a trailer of the type described in the preamble which is distinguished in that the roof part and rear wall part and the roof part and front wall part are connected to each other for pivoting on a horizontal axis.

As a result of this location of the pivoting axes it is possible to fold the front and rear wall parts beneath the roof part, which considerably lowers the height of the trailer, thereby ensuring its maneuverability. Folding out of the trailer can be carried out by applying a force to the front wall part with the tractive vehicle while restraining the rear wall part, so that the trailer folds out automatically and finishes up in the user position. All further manual operations are then superfluous.

The side walls and base can take a random form, but according to the invention it is recommended that the longitudinal walls be manufactured of one or more removable panels between front and rear wall parts and roof part. These panels can be stored away in the three previously mentioned pivoting parts before folding up.

The same embodiment relates to the floor, which according to the invention can also consist of removable panels.

In one embodiment at least the rear wall part has a lockable wheel set, which on the one hand serves to support the trailer during transport of same and on the other serves as a temporary support when the trailer is folded out, by locking this wheel set against rotation.

It is also recommended according to the invention that the tow-bar be connected for pivoting to the front wall part, whereby the tow-bar is provided at the pivoting end with a second wheel set.

This second wheel set can take the form of a pair of support rollers which only have a supporting function when folding out takes place.

Alternatively the second wheel set can form a tandem axle together with the first wheel set.

In another embodiment the trailer is provided with a fixed chassis with tow-bar, on which the front and rear wall parts are mounted for sliding. In this embodiment the wheels do not have to be directly coupled to the front and rear wall parts, but can be attached directly to the chassis as, for example, a tandem axle.

Sliding of the front and rear wall parts is performed preferably by means of a guiding on the chassis by a cylinder. Actuation of the cylinder can be carried out in any random manner.

Finally, it is recommended that the roof, rear and/or front wall parts be given a box or tray-like form. Such a box or tray-like form offers the advantage that a cupboard or kitchen lay-out can already be permanently arranged in the box. This also achieves the advantage that the total length of the trailer after folding out is increased considerably, since the depth of the front and rear wall parts is added to the roof length, which results in a much greater space than in known folding trailers.

The invention is further elucidated in the figure description of an embodiment following below.

Figure 2:
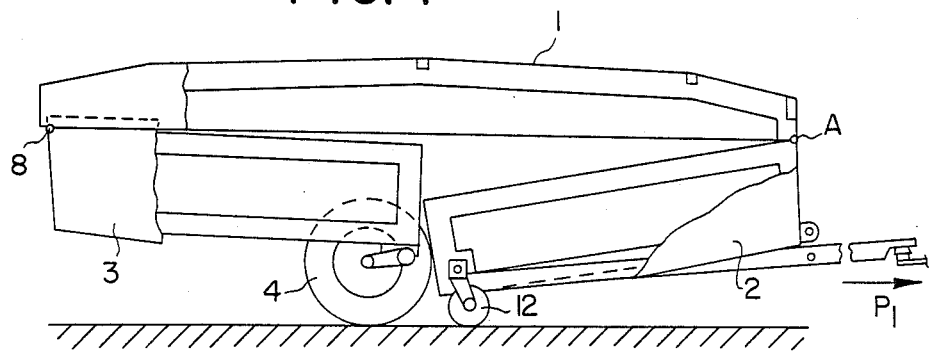
Figure 3:
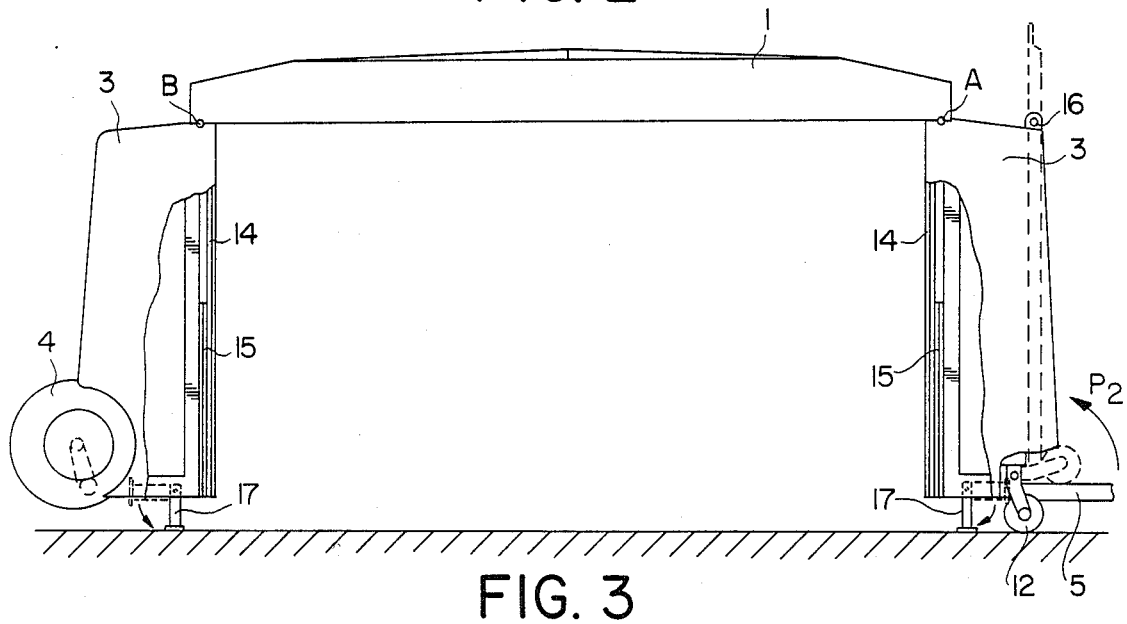
Figure 4:
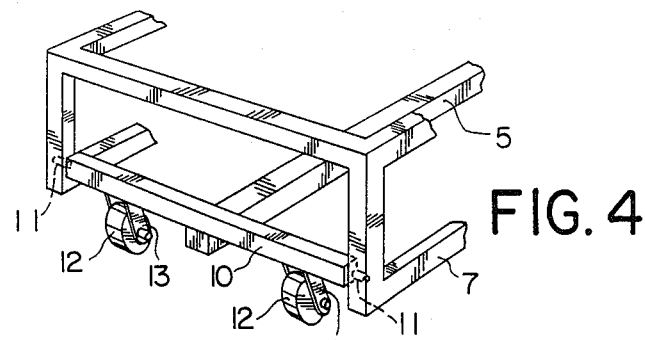
Figure 5:
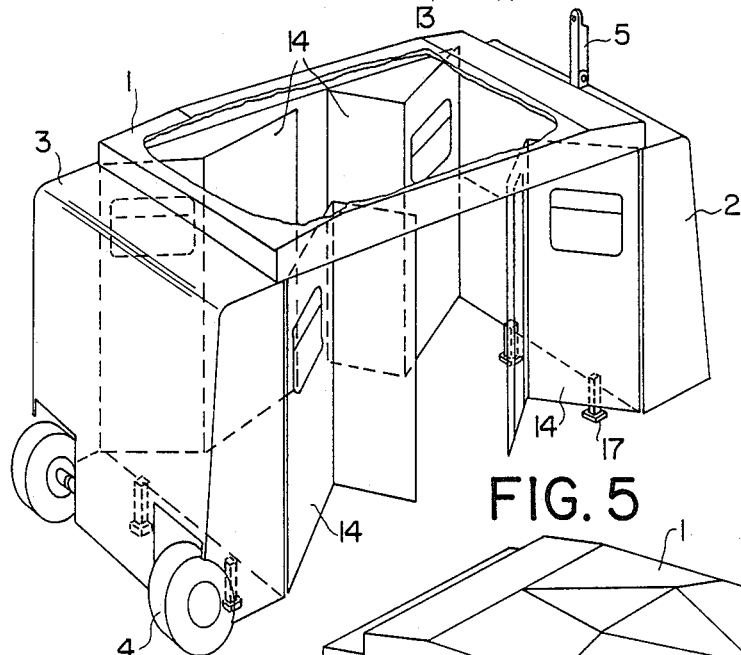
Figure 6:
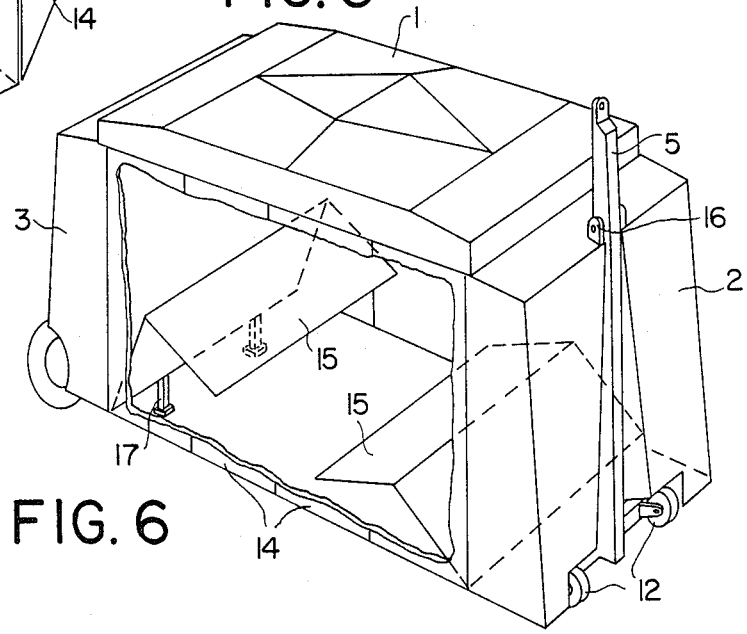

In the drawing:

FIG. 1 shows an upright side view with partly broken away portions of the trailer according to the invention, in the towed travel position, FIG. 2 shows a similar side view of the trailer from FIG. 1, at the start of the folding out of same, FIG. 3 shows an upright side view of the folded out trailer from FIG. 1, FIG. 4 is a perspective view of a detail of the support frame with tow-bar, FIGS. 5 and 6 each show a perspective top view of the folded out trailer in the folded out position during fitting of side panels and base panels respectively, FIGS. 7 and 8 each show a side view of a second embodiment in respectively folded and unfolded state, FIG. 9 is a perspective top view of the chassis employed in the embodiment shown in FIGS. 7 and 8, FIG. 10 shows a detail of the guide from the chassis in FIG. 9.

Indicated in the drawing with the numeral 1 is the roof part, with 2 the front wall part and with 3 the rear wall part of the trailer. The whole is carried by a wheel set 4. The trailer is towed by means of a tow-bar 5 which is connected in known manner to the towing ball 6 of a tractive vehicle (not shown).

The front and rear wall parts 2, 3 are connected to the roof part 1 at the pivot axes A and B, respectively. The pivot axes run horizontally and lie close to the front and rear edges of roof part 1.

Each part can take a box or tray-like form and is provided for this purpose in the embodiment shown with a window-like beam frame 7, 8 and 9 which is covered on the side facing the outside with a covering of random material. In this way is created a closed trailer, which contributes to a small air resistance.

The tow-bar 5 is preferably connected at C to the frame part 7 for pivoting on an axis parallel to that of A and B, see also FIG. 4. The tow-bar 5 is formed for this purpose at the rear end with a cross beam 10 connected firmly to it, which beam is provided at both ends with axle journals 11. These axle journals 11 are mounted in random manner in the beam frame 7 of the front wall part 2. Arranged on the underside of cross beam 10 are a pair of support rollers 12, which are mounted for free rotation in arms 13 connected firmly to beam 10.

Folding out of the trailer from FIG. 1 is carried out as follows.

As a result of blocking the wheel set 4 by random means (not shown) and releasing locks (not shown) fitted between the parts, the front wall part 2 will drop downward on the pivot axis A until support wheel 12 reaches the ground, see FIG. 2. The tractive vehicle can then move forward in the direction of the arrow $P_1$ in FIG. 2, which results in an upward movement of the front wall part, which tilts further underneath axis A. The roof part 1 is hereby moved upward, whereby the rear pivot axis B also moves upward because the rear wall part 3 will tilt round wheel set 4 in clockwise direction. This movement can be continued until the position as in FIG. 3 has been reached. The user can, if necessary place separate supports 17 under the front and rear wall parts, these supports being folded downward at the correct moment relative to beam frames 8, 9.

The now open side walls and base of the trailer can be closed in random manner, for example by means of tent-cloth and the like.

It is however also possible to form the side wall from one or more removable panels. A possible embodiment is shown in the FIGS. 5 and 6. Each front and rear wall part contains a double hinged panel 14 which is also connected for pivoting to the associated box-like front and rear wall parts. A floor panel 15 can in this way also be formed for pivoting with the associated front and rear wall parts.

If required the side wall panels can also be accommodated in the roof part.

These panels can be formed in the normal way with windows for the necessary incidence of light. These windows can also be situated in the bottom of the box-like front and rear wall parts.

Owing to the box form of the front and rear wall parts, the latter can be pre-formed with cabinets, a bathroom/toilet area, kitchen and the like, whereby the roof part can likewise be provided with storage space.

Folding in of the trailer into the travel position as in FIG. 1 is performed in reverse sequence. This can be carried out by performing a movement with the tractive vehicle in the opposite direction of arrow $P_1$ as in FIG. 2, as a result of which the trailer automatically folds up.

It is finally noted that the tow-bar 5, which at the start was located in a horizontal position, can be raised upward in the folded out position as according to arrow $P_2$ in FIG. 3 and can be locked at 16 in FIG. 6.

The FIGS. 7-10 show another embodiment which is provided with a fixed chassis 20 consisting of two longitudinal beams 21 and a number of transverse beams 22 arranged at the correct positions. The form of the chassis can be of a random type.

Arranged at the front is a tow-frame 23 provided with a tow-bar 24 which can be attached in the usual manner to a tractive vehicle. The chassis is provided with swing-out supports 25 which are assumed to be per se known.

In addition the chassis is formed with a double wheel set or tandem axle, whereby each wheel set is suspended spring-mounted relative to chassis 20 via a torsion shaft 26.

A particular feature according to the invention is that the chassis is formed with a guide 27, which also serves as support rail for a travelling wheel 28, which will be further explained below. Travelling wheel 28 extends through the guide with an arm 29, to which is coupled the cylinder rod of a cylinder 30. The cylinder 30 supports on the frame 23 on the front of the chassis.

A second guide 27' is mounted in a similar manner, but on the front part of the chassis, whereby a cylinder 30' grips onto the associated arm of the roller 28'. This cylinder supports on the rear transverse beam of the chassis.

It is presumed that the front and rear wall parts, which here take the form of a box-like part 3, are each formed at a lower edge 31 of the box with the respective guide wheels 28 and 28'. During folding out the guide wheel 28 will roll along the top of guide 27 from the position as in FIG. 7 to the position in FIG. 8, which is effected in the embodiment being described by actuating the respective cylinders 30 and 30'. These press the roller 28 by means of the lever 29 in the required direction, as a result of which the front and rear panels fold out, this movement corresponding with the movement as according to the FIGS. 1-3.

In view of the box-like front and rear wall parts, wheel 28 has to be displaced rearward over a distance that is greater than the length of the guide track 27, see FIG. 10 inter alia. This elongation can be effected by incorporating a telescopic part 32 in guide 27. As soon as the roller set 28 reaches the end of track 27 this part 32 will also be moved, together with the roller set 28, out of the guide 27 by the cylinder 30.

The sliding movement can be improved by forming the end of part 32 with a transverse beam 33 which is provided at both ends with a telescopic sliding part 34.

Roller set 28' which rolls over the track 27' has a similar construction, so that each roller 28, 28' can be carried far outside the normal length of the chassis, which enlarges the total accommodation length relative to the transport length of the trailer.

The side panels in the embodiment as according to FIGS. 7 and 8 can be fitted in a manner corresponding to that shown in FIG. 5. It is however also possible to swivel the side panels downward from the roof part, this being assumed in FIG. 8.

It will be apparent that the form of the box-like front and rear wall parts can have any random shape, in order to accommodate exceptional forms of guiding or required lay-out of the caravan as according to FIGS. 7 and 8.

It will be apparent that more than one cylinder can be fitted, which can then be placed parallel next to one another or in series behind one another.

The invention is not limited to the above described embodiment. It is thus possible to replace the pair of rollers 12 with a wheel set the same as that (4) of the rear wall part 3. In this way a kind of tandem axle trailer is obtained, which is very suitable for large embodiments. In its folded out position the trailer does not have to be arranged stationary, but, depending on the positioning and size of the wheel sets, a mobile embodiment can also be obtained. The enlarged trailer can then be used for transport. In this embodiment, the front wheel set of the tow-bar can be mounted for pivoting on a vertical shaft in order to enable steering. The box-like parts shown can also be made as double-walled, foam filled, self-supporting bodywork elements, whereby the beam system as in FIG. 4 becomes superfluous.

I claim:

1. A trailer for providing residential or temporary accommodation, such as a caravan, consisting substantially of a roof part, a front wall part and a rear wall part, said roof part having a forward end and a rearward end, said front wall part having a pivot end and a support end and said rear wall part having a pivot end and a support end, forward pivot means connecting the pivot end of the front wall part to the forward end of the roof part about a forward horizontal axis, rearward pivot means connecting the pivot end of the rear wall part to the rearward end of the roof part about a rearward horizontal axis, the lengths of the front wall part and the rear wall part between their pivot and support ends being substantially the same and being of combined length substantially the same as the length of the roof part between its forward and rearward ends, at least one wheel set with tow-bar bearing said roof, said front wall and said rear wall parts.

2. A trailer as claimed in claim 1 including longitudinal walls which consist of removable panels between the front and rear wall parts and the roof part.

3. A trailer as claimed in claim 1 including a floor which consists of removable panels between the front and rear wall parts.

4. A trailer as claimed in claim 1 including at least one lockable wheel set connected to the rear wall part.

5. A trailer as claimed in claim 1 wherein the tow-bar is connected for pivoting by a pivot joint to the front wall part and is provided close to the pivot joint with a second wheel set.

6. A trailer as claimed in claim 5 wherein the second wheel set is a pair of support rollers.

7. A trailer as claimed in claim 1 including a chassis with said tow-bar, said front and rear wall parts being displacable along said chassis.

8. A trailer as claimed in claim 7 including guide means on said chassis for guiding the front and rear wall parts, and a cylinder for each front and rear wall part for movement along the guide means on the chassis.

9. A trailer as claimed in claim 1 wherein at least one of the roof part, rear wall part and front wall part has a tray-like form.

10. A trailer as claimed in claim 9 wherein each tray-like part forms a space for housekeeping purposes.

11. A trailer as claimed in claim 9 wherein each tray-like front and rear wall part is provided with a guide roller along the bottom edge thereof and wherein the chassis can be telescopically extended.

12. A convertible towed vehicle comprising the combination of a frame having a front wall part, a rear wall part and a roof part bridging between the front and rear wall parts, first pivot means defining a forward horizontal axis fixedly connecting the front wall part to the roof part for relative pivoting movement about the forward horizontal axis whereby the front wall part is movable between a traveling position underlying the roof part and a converted position elevating the roof part above the traveling position thereof, second pivot means defining a rearward horizontal axis connecting the rear wall part to the roof part for relative pivoting movement about the rearward horizontal axis whereby the rear wall part is movable between a traveling position underlying the roof part and a converted position elevating the roof part above the traveling position thereof, the front wall, rear wall and roof parts defining a living space when in the converted positions thereof, means for attaching the convertible vehicle in towed relation behind a powered vehicle, and wheel support means supporting said frame for trailing the convertible vehicle behind the towing vehicle.

13. A convertible vehicle as defined in claim 12 wherein said means for attaching comprises a tow-bar having a chassis portion underlying said front wall part in the traveling position thereof and pivotally connected thereto about a horizontal axis.

14. A convertible vehicle as defined in claim 12 wherein said wheel support means comprises a wheel depending from said front wall part in the traveling position thereof.

15. A convertible vehicle as defined in claim 12 including a chassis underlying said front wall part, said roof part and said rear wall part, said wheel support means depending from said chassis, and guide means on said chassis for guiding said front and rear wall parts in relatively opposite directions along said chassis while pivoting such parts about said forward and rearward horizontal axes between traveling and converted positions thereof.

16. In a convertible trailer, the combination of an elongate front wall part movable between a generally horizontal position while being toward and a generally vertical position defining upper and lower ends when converted, an elongate rear wall part movable between a generally horizontal position while being towed and a generally vertical position defining upper and lower ends when converted, and an elongate roof part pivotally connected adjacent its opposite ends to the respective upper ends of said front and rear wall parts, whereby the front and rear wall parts are folded under the roof part while being towed and define uprights bridged between the upper ends of the front and rear wall parts by the roof part when converted.

17. In a convertible trailer as defined in claim 16 wherein the lower ends of the front and rear wall parts are closely adjacent while being towed.

18. In a convertible trailer as defined in claim 17 including a supporting wheel set depending from the lower end of said rear wall part while being towed so as to support the trailer while being towed.

19. In a convertible trailer as defined in claim 16 wherein opposite side wall spaces and a floor space are defined between the front and rear wall parts when the trailer is converted and including accordion-folded side wall parts in said front and rear wall parts for closing said side wall spaces and accordion-folded floor parts in at least one of said front and rear wall parts for closing said floor space.

20. In a convertible trailer as defined in claim 19 including a chassis and support wheel means depending from said chassis to support the trailer both while being towed and when converted, the lower ends of said front and rear wall parts being guidable in relatively opposite directions along said chassis between converted and towing conditions.

* * * * *